United States Patent [19]

Woodward

[11] Patent Number: 4,942,573
[45] Date of Patent: Jul. 17, 1990

[54] LOOSELY COUPLED PARALLEL NETWORK SIMULATOR

[75] Inventor: Thomas R. Woodward, West Chester, Pa.

[73] Assignee: Unisys Corporation, Blue Bell, Pa.

[21] Appl. No.: 30,024

[22] Filed: Mar. 25, 1987

[51] Int. Cl.[5] .............................................. H04J 3/02
[52] U.S. Cl. .................................................. 370/85.9
[58] Field of Search ................. 370/86, 86, 110.1, 88; 340/825.5, 825.51

[56] References Cited

U.S. PATENT DOCUMENTS

| | | | |
|---|---|---|---|
| 4,156,112 | 5/1979 | Moreland | 370/85 |
| 4,488,290 | 12/1984 | Dunn et al. | 370/85 |
| 4,535,448 | 8/1985 | Baxter et al. | 370/85 |
| 4,538,261 | 8/1985 | Rume | 340/825.5 |
| 4,631,534 | 12/1986 | Franklin et al. | 370/85 |

Primary Examiner—Joseph A. Orsino
Assistant Examiner—Frank M. Scutch, III
Attorney, Agent, or Firm—Mark T. Starr; Robert S. Bramson; John B. Sowell

[57] ABSTRACT

A loosely coupled parallel network simulator has been described which employs a time multiplex bus to which a plurality of processing sites are coupled with each processing site being assigned one or more particular time slots during the bus cycle. Each processing site contains a sequencing RAM or control store which determines that clock time during the bus cycle that the processing site is to be given access for either transmission or reception of data segments.

7 Claims, 7 Drawing Sheets

END OF BUS CYCLE

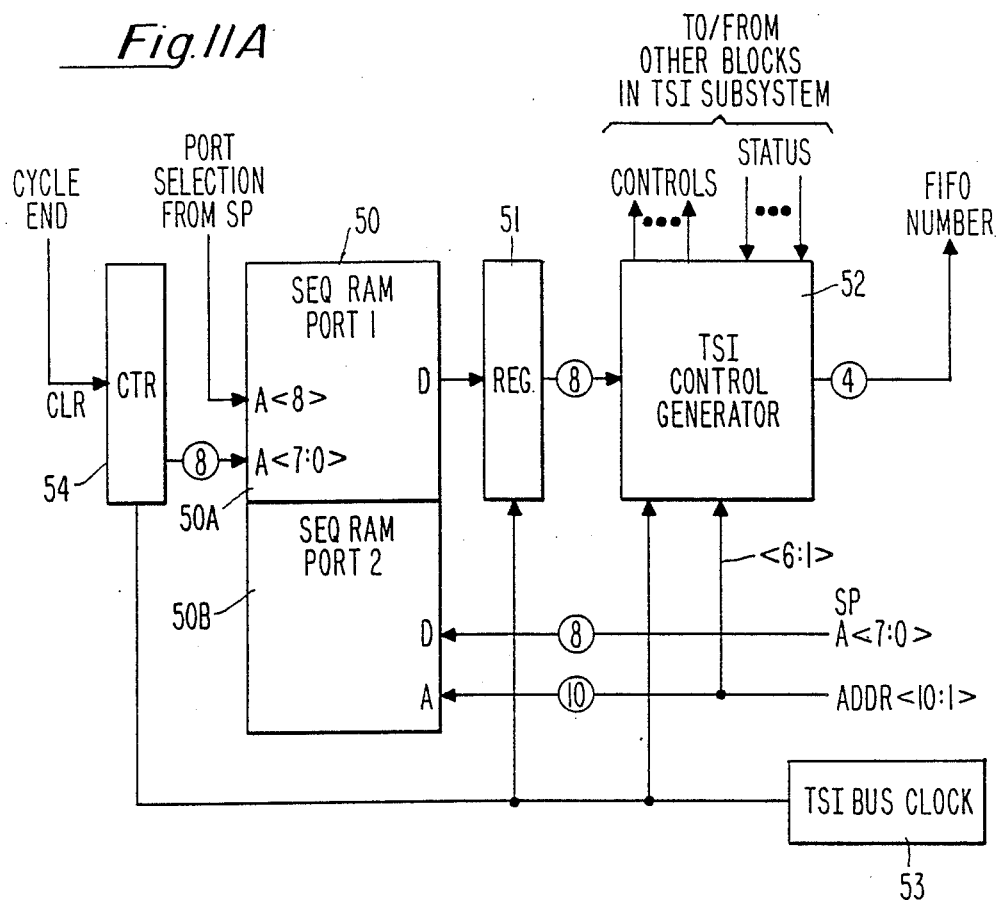

LOOSELY COUPLED PARALLEL NETWORK SIMULATOR

BACKGROUND OF THE INVENTION

1. Field of the Invention

This invention relates to a parallel network simulator and more particularly such a simulator for simulating data transfer between a variety of different processing sites.

2. Description of the Prior Art

Partly because of, and partly in spite of, great improvements in integrated circuit density resulting in more powerful microprocessors and also more powerful processors, more and more interest has been directed toward parallel or concurrent processing. In spite of improved integrated circuit technology which allows for more powerful and smaller data processing systems, it is generally believed that, in the future, increased data processing throughput can only be achieved through such parallel processing. On the other hand, because of the present availability of more powerful single chip microprocessors, it is much easier to build such parallel or concurrent networks of such processors with a principal limitation being the adaptability of different programming languages to such parallel execution.

Standard computer languages that have been employed for the most part up to now have been of the von Neumann or imperative type languages which are highly sequential in nature and difficult to break up into individual segments for large scale parallel processing because of the dependency of the code upon the sequence in which it resides. Such standard languages are FORTRAN and COBOL. Languages such ALGOL, which are block structured, represent at least some attempt to get away from this highly sequential nature.

Some effort has been made to segment such sequential languages or at least their object code into small sequences that can be executed in parallel or concurrently. Examples of such a method is disclosed in the DeSantis et al U.S. Pat. No. 4,468,736 which is assigned to the assignee of the present invention.

As distinct from the imperative type languages described above, which may be said to be command-driven driven, there has been a great amount of investigation into applicative languages which may be said to be demand-driven in that only those functions are evaluated as are necessary. And the languages are completely concurrent in that the respective functions can be evaluated independently of one another subject to certain constraints.

There are two basic types of such applicative languages, logical languages and functional languages. Logical languages such as PROLOG are made up of a series of expressions that are independent of one another. Functional languages such as LISP are made up of a series of statements that can be compiled into graphs that can be reduced or evaluated. Such reduction is by progressive substitutions of equivalent expressions. An example of a reduction processor for reducing a functional language is described in the Bolton et al U.S. Pat. No. 4,447,875 which is assigned to the assignee of the present invention and a network of such processors for concurrent evaluation or reduction is described in the Bolton et al U.S. Pat. No. 4,502,118 which is assigned to the assignee of the present application.

With such languages that are made up of a series of independent expressions or statements, it then becomes very natural to adapt parallel networks for the concurrent or parallel evaluation of such languages. However, it is not the intention of the present invention to be limited to applicative languages and as was pointed out above in regard to the DeSantis et al patent, conventional and imperative languages can also be adapted for parallel execution by large parallel networks.

Because of the great variety of different languages that can be adapted to different networks for parallel execution, the individual networks should be configured to take advantage of the particular languages and types of sequences being executed.

It is, therefore, an object of the present invention to provide an improved parallel network simulator for the purpose of evaluating different network configurations.

It is another object of the present invention to provide an improved network simulator for the simulation of networks of any degree of connection between processing sites.

It is still a further object of the present invention to provide such a parallel network simulator wherein the networks being simulated are loosely coupled so that the simulator can readily be changed by the programmer to simulate other types of networks.

SUMMARY OF THE INVENTION

In order to accomplish the above-identified objects, the present invention is directed toward a time multiplexed bus to which are attached a number of processing sites. Each processing site contains a reduction processor or work processor for whatever purpose the particular network is intended and an interchange subsystem coupling the working processor to the bus. All processing sites are driven by the same clock and connected to the clock source in such a way as to insure synchronization of the time multiplexing. Each interchange subsystem contains a sequencing RAM or control store which determines at what clock time during the bus cycle the processing site is to be given access to the bus to either transmit or receive data segments. The number of clock times in a bus cycle will equal the number of connections being simulated among the processing sites coupled to the bus. In this manner, the connection between any two processing sites can be simulated by coordinating the sequencing RAMs or control stores to cause appropriate processing sites to access the bus at the same time. All connections between a processing site and one or more processing sites may be so simulated. Because of limitations on the bus length due to the clock rate employed, a time multiplex switch is provided to connect a plurality of such time multiplexed buses.

A feature then in the present invention resides in a bus to which a plurality of processing sites are attached with each processing site having a sequencer to give its respective processing site access to the bus at the same time as does another processing site to simulate a connection there between.

BRIEF DESCRIPTION OF THE DRAWINGS

The above and other objects, advantages and features of the present invention may become more readily apparent from a review of the following specification when taken in conjunction with the drawings wherein:

FIG. 11A and 11B are a diagram of the interface control logic as employed in the present invention and a table of the control words employed thereby.

GENERAL DESCRIPTION OF THE INVENTION

Figure 1:
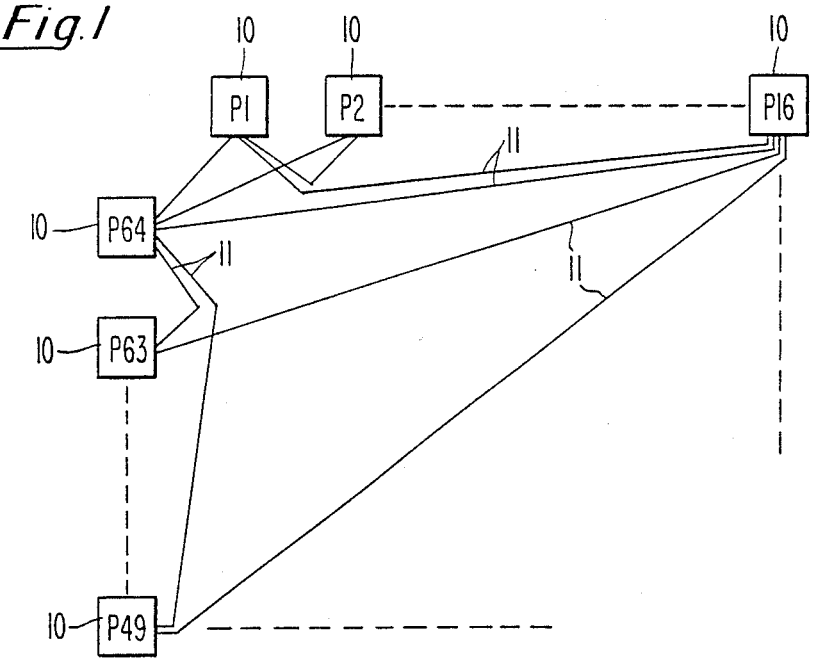
FIG. 1 represents a generalized diagram of the various combinations of connections between processing sites that can be simulated.

A parallel network of processing sites is illustrated in FIG. 1. As shown therein, a plurality of such processing sites or elements 10 may be connected together in any configuration such that any given processing site may be connected to any other processing site or to a number of such other processing sites or to all of the other processing sites by a plurality of interconnecting buses 11. The purpose of the present invention is to provide a loosely coupled network simulator for simulating the various combinations of interconnections to determine which combinations best suit a given programming language and the corresponding tasks to be executed in parallel by the respective processing sites.

Figure 2:
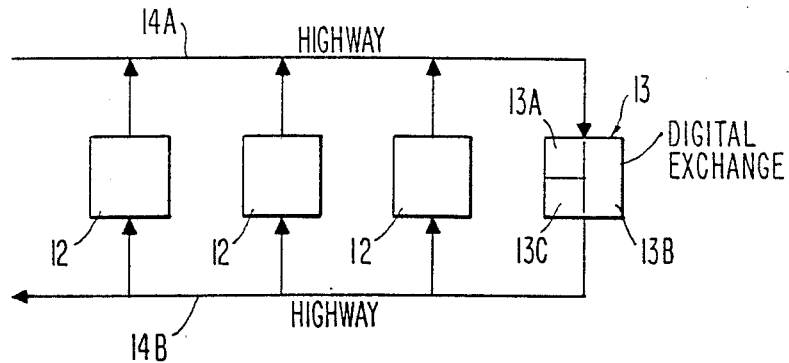
FIG. 2 represents a diagram of prior art techniques employed to implement present invention as a simulator.

The technique employed in the present invention is one that has been employed in the telephone arts for a number of years, particularly in the development of exchanges for digital switching. Such a prior art digital switching exchange for a telephone network is illustrated in FIG. 2. As shown therein, a plurality of telephone transmitting and receiving stations 12 communicate with one another by way of digital exchange 13. The technique employed therein is referred to as a Time Slot Interchange (TSI) whereby each of the stations 12 transmits an information segment to interchange 13 during a preassigned time slot and receives information segments from exchange 13 during that time slot. Transmission to exchange 13 is by way of a time multiplex "highway" or bus 14A and reception from exchange 13 is by way of such a "highway" 14B. Exchange 13 includes a receiving memory 13A with the data segments being stored therein in the chronological order in which they are received. Exchange logic 13B transfers those data segments from receiving memory 13A to highway 14B utilizing a "mapping memory" 13C. The order in which the segments are transferred from receiving memory 13A to highway 14B, determined by the contents of mapping memory 13C, is rearranged according to the destination of each of the information sements. In this manner, a data segment destined for a particular station 12 will be transmitted during the timeslot that has been assigned to that particular station.

Figure 3:
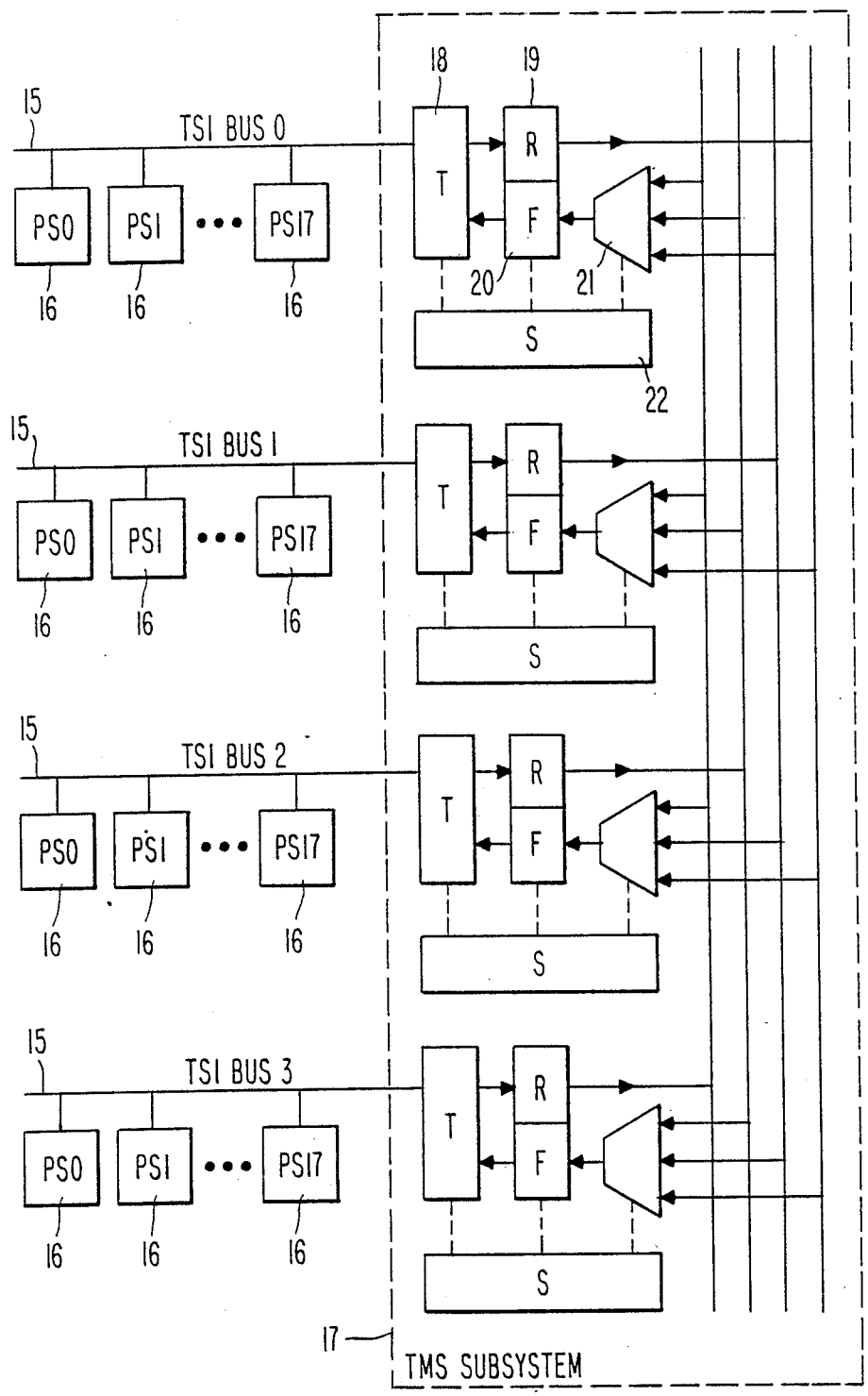
FIG. 3 is an overall diagram of a plurality of such processing sites and their corresponding buses showing how they may be interconnected by a time multiplexed switch.

An embodiment of the present invention is illustrated in FIG. 3 which shows a plurality of such TSI buses which can be interconnected by Time Multiplexed Switch (TMS) subsystem 17 depending upon the number of processing sites 16 that are to be incorporated into the network being simulated. Each TSI bus 15 is capable of operating independently of the others and of TMS subsystem 17. The receiving and mapping memories and the control logic therefore is distributed throughout the respective processing sites 16 attached to each of the TSI buses 15 in a manner that will be more thoroughly described below.

Figure 4:
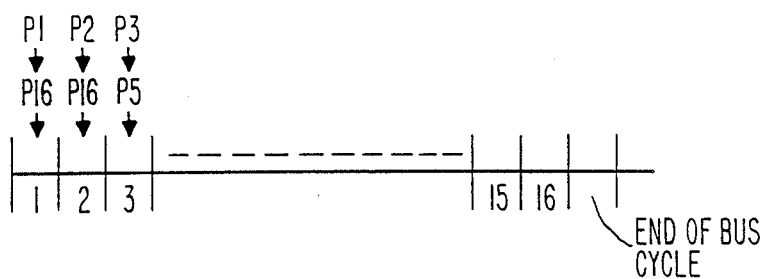
FIG. 4 is a timing diagram of the operation of a time multiplex bus of the present invention.

To better illustrate the technique employed in the simulator of the present invention, reference is made to FIG. 4 which is a timing chart representative of one of the TSI buses 15 FIG. 3. In FIG. 3, each TSI bus 15 is provided with 18 processing sites, 16 of which can be employed in a network with one of the remaining sites being reserved as a spare and the last site being used as a host site to interconnect an outside source for transmission to the remaining processing sites when it is desired to change the configuration of the network being simulated. In FIG. 4, the TSI bus cycle is made up of 16 timeslots with the actual number of timeslots being equal to the number of connections simulated between processing sites connected to the corresponding TSI bus. Thus, for example, if it were desired to connect processing site 1 to processing site 16, then their corresponding sequencing RAM's (which correspond to mapping memory 13 C of exchange 13 of FIG. 2) of each of those processing sites would access the TMI bus during timeslot 1. If it were desired to connect processing site 2 to processing site 16 then those two processing sites would be scheduled to have access to TSI bus during timeslot 2. If it were desired to connect processing site 3 to processing site 5, then those two processing sites would be scheduled to have access to the TSI bus during timeslot 3 and so on. The TSI bus is bi-directional so that the particular processing sites coupled to the bus can communicate in either direction. However, during a particular time slot communication can be in only one direction and two time slots are required for bidirectional communication between two sites.

Figure 5:
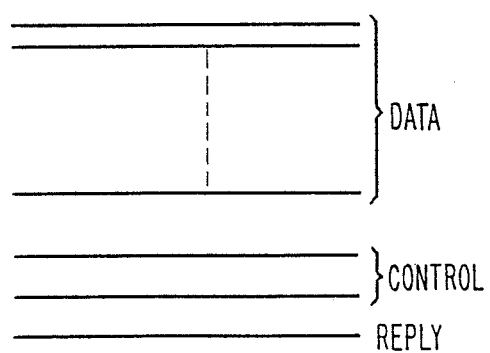
FIG. 5 is a diagram of the time multiplex bus employed.

If two processing sites try to transmit at the same time, an appropriate mechanism is supplied to detect that situation as is further discussed below. FIG. 5 is a representation of the respective TSI buses 15 of FIG. 3. As shown therein, the embodiment disclosed herein contains 16 data lines, 2 control lines and a single reply line. If during the simulation operation, a given processing site is scheduled to transmit a data segment during a particular timeslot, it will place that data segment on the 16 bit data bus and place appropriate signals on the two control lines which can indicate four different conditions three of which pertain to the type of data and the fourth of which indicates an end of bus cycle which resets the various processing site interchanges which will be more thoroughly described below. If a given processing site is scheduled to receive a data segment during a particular timeslot, it places a signal on the reply line as it is given access to the bus to receive that data segment. If the transmitting processing site does not detect such a reply signal when it is transmitting, its interchange will generate an interrupt signal which will later be dealt with by the other elements of the processing site.

Referring back to FIG. 3, a description will now be provided of the TMS subsystem which is employed to extend the capacity of a TSI bus to accommodate additional processing sites. In the implementation of the embodiment described herein, a 100 nanosecond clock is employed and thus TSI bus is limited to approximately six feet of length beyond which signal distortion would begin to appear.

Each TSI bus 15 is coupled to TMS subsystem 17 by transceiver 18. When the TMS subsystem is to pick off a data segment from a given TSI bus 15, it is transferred to register driver 18 and to a corresponding bus within TMS subsystem 17 for transmission to the other TSI buses 15. When a data segment is to be inserted in the time slot of a given processing site, it is received from one of the buses within TMS subsystem 17 by multiplexer 21 and placed into a small FIFO memory 20 from which it is transferred to its corresponding TSI bus during the appropriate timeslot. The sequencing of when data segments are picked off and inserted into selected timeslots of a given TSI bus 15 is controlled by corresponding sequencing RAM 22.

Figure 6:
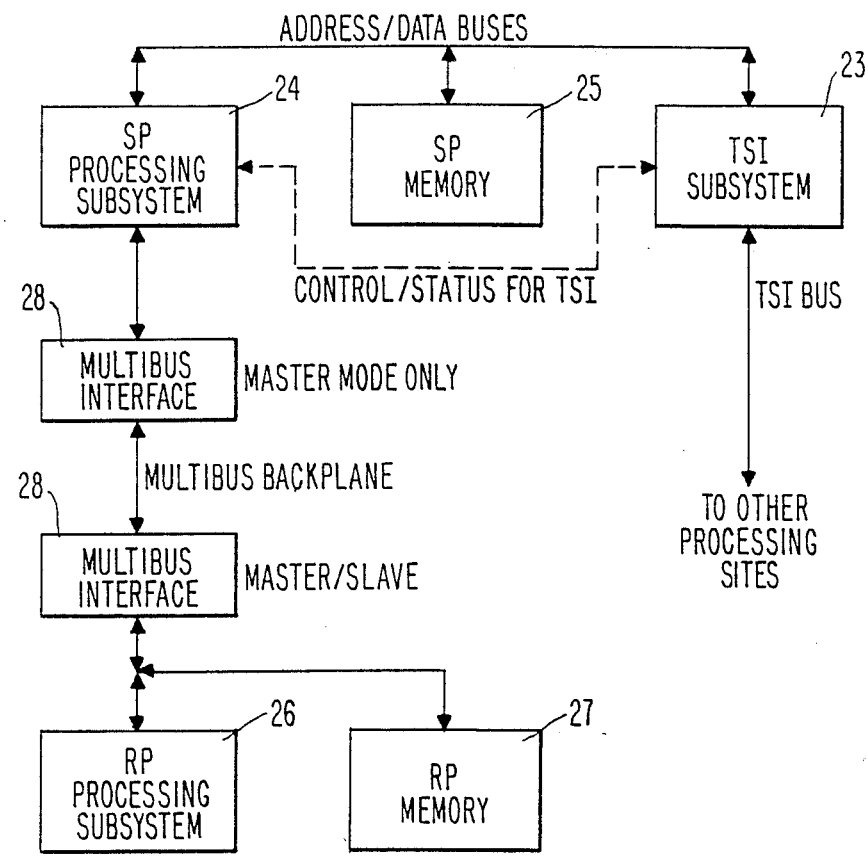
FIG. 6 is a diagram illustrating the various subsystems of a typical processing site.

The functional units in each of the respective processing sites 16 of FIG. 3 are illustrated in FIG. 6. As shown therein, TSI subsystem 23 serves the same purpose as digital exchange 13 of the prior art FIG. 2 and, as will be more thoroughly described below, contains the receiving memory, the mapping memory and the control logic of that exchange. As was pointed out above, the functions of these units is distributed throughout the respective processing sites in the present invention. Switching processor 24 generally serves to switch data and other information to and from TSI subsystem 23 and may be a commercially available microprocessor such as an Intel 80186. It switches all information segments between TSI subsystem 23 and switching processor memory 25 and from there to reduction processor memory 27. In addition, switching processor 24 can send commands and other information to reduction processor 26 by way of multibus interfaces 28. The only reason for the employment of multibus interfaces 28, is that in the implementation of the present invention, reduction processor 26 and reduction processor memory 27 are on a different circuit board than the rest of the processing site. If they were on the same circuit board then multibus interfaces 28 could be eliminated. Reduction processor 26 may be a commercial microprocessor such as a Motorola MC68020.

DETAILED DESCRIPTION OF THE INVENTION

As was indicated above, all of the units in FIG. 6 can be commercially available items with the exception of TSI subsystem 23. As further indicated above, all of the TSI subsystems connected to the TSI bus form the distributed control of the bus in much the same way as does digital exchange 13 of prior art telephone switching exchanges. Thus, the remaining description that follows will basically be concerned with the TSI subsystem.

Figure 7:
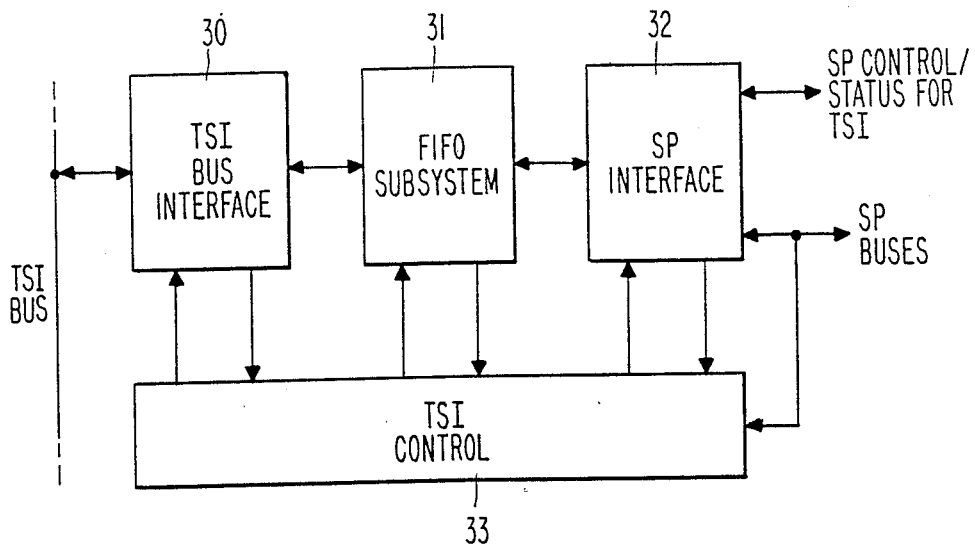
FIG. 7 is a diagram of the organization of the interface subsystem of a typical processing site.

FIG. 7 illustrates the general organization of the TSI subsystem. As shown therein, the basic units of this subsystem are TSI bus interface 30 which performs actual accessing of the TSI bus for both transmission and reception; FIFO subsystem 31; the Switching Processor (SP) interchange which communicates with the Switching Processor 24 of FIG. 6 and receives control information therefrom. All three of these units are under control of TSI control 33 which, as will be described below, controls the operation of the three units as well as contains the sequencing RAM or control store for determining when the associated processing site is to access the TSI bus.

Figure 8:
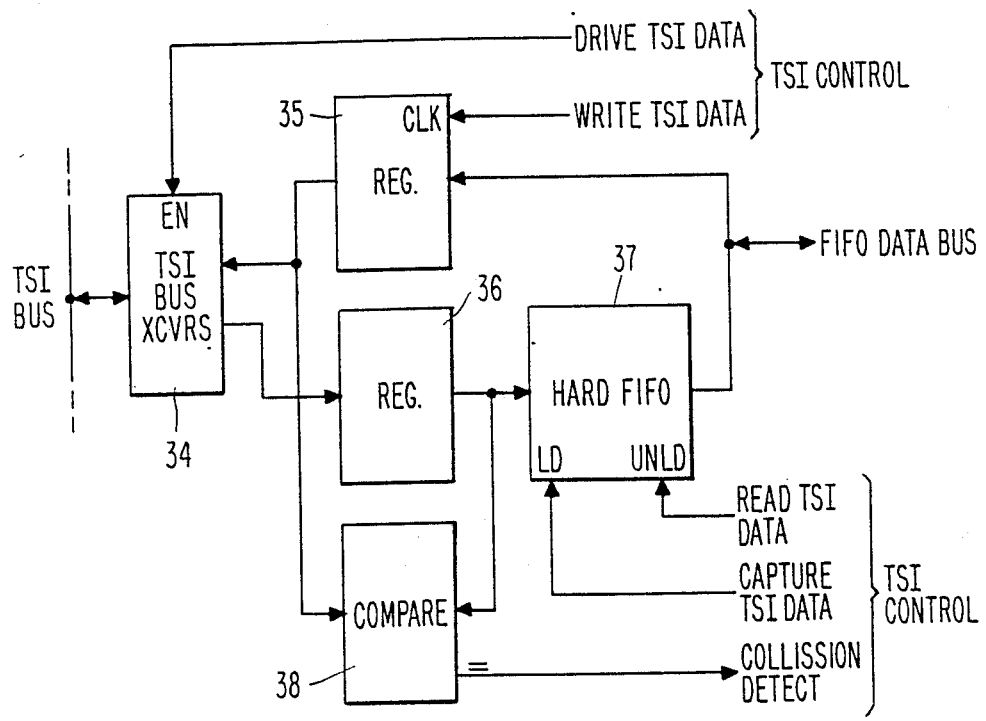
FIG. 8 is a block diagram of the bus interface unit of the present invention.

TSI bus interface 30 is illustrated in more detail in FIG. 8 and includes bus transceivers 34 which are coupled to the TSI bus and are enabled by a drive TSI data signal from control unit 33 of FIG. 7 during that time slot that the corresponding processing site is to access the TSI bus for transmitting. When data is to be written onto the TSI bus, it is first transferred from FIFO subsystem 31 of FIG. 7 to register 35 by a write data signal from TSI control 35 of FIG. 7 and later driven onto the TSI bus by tranceivers 34. When the processing site is to receive data during a selected time slot, the data is transferred through tranceivers 34 to register 36 and then to hard FIFO 37 when a capture data signal is received thereby from the TSI control. Hard FIFO is a set of registers arranged in a first in-first out order and embodied in circuitry as distinct from FIFO subsystem 31 of FIG. 7 which is formed of a random access memory and requires two clock times for access. Hard FIFO 37 of FIG. 8 can receive the data segment in one clock time, it being remembered that, in the implementation of the embodiment described, each clock time is 100 nanoseconds.

Comparator 38 is provided to detect when another processing site is transmitting during a given time slot and the current processing site is scheduled to transmit. When such a comparison is detected, TSI control 33 is sent an interrupt signal indicating a collision.

Figure 9:
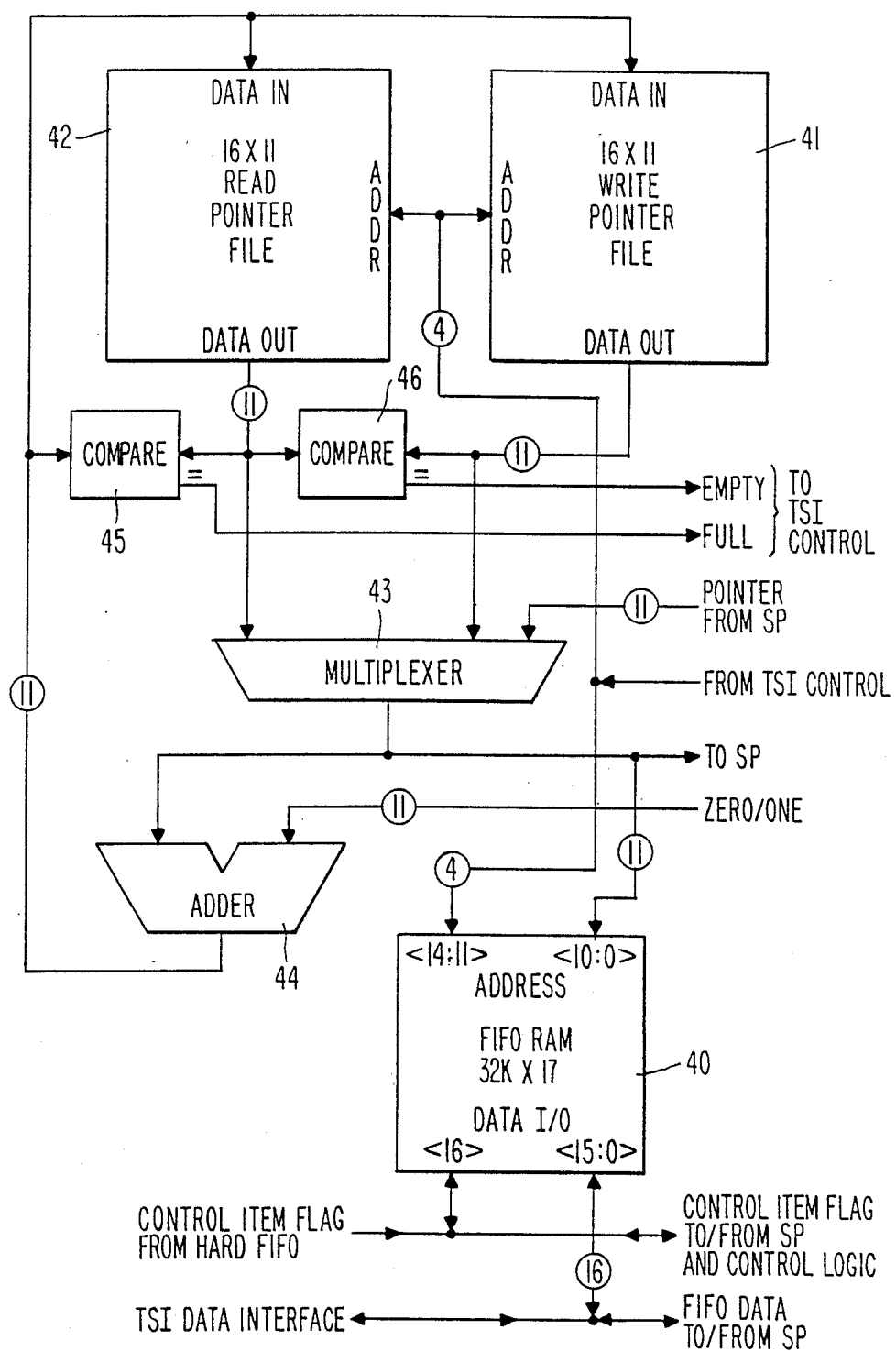
FIG. 9 is a diagram of the FIFO subsystem of FIG. 7.

FIFO 31 of FIG. 7 is illustrated in more detail in FIG. 9. Data is stored in random access memory 40 which in the present embodiment is organized as 32K words of 17 bits each. Random access memory 40 is divided into 16 blocks of 2K words each, with one block reserved for each FIFO, there being one such FIFO required for each direction of each simulated connection to a processing site. Two pointers of 11 bits each are provided for each FIFO to hold the read and write locations for data within each block. To this end, write pointer file 41 and read pointer file 42 each contain 16 locations of 11 bits each. Data is written into a particular FIFO block by writing the data into random access memory 40 using that block's write pointer as an offset into the appropriate 2K block and then incrementing the write pointer. Similarly, reading of a particular block is done by reading memory 40 using the read pointer for that block as an offset and incrementing it. The number of the particular block being accessed at a given time is used as an address to the register files and as the most significant 4 bits of the address of memory 40. An 11 bit pointer is used as the least significant bits of the address. Multiplexer 43 is used to select the output of the read pointer file as the lower memory address, while during the write operation the write pointer is chosen. The output of multiplexer 43 is also sent through adder 44, where the value "one" is added to the pointer. The output of adder 44 is written back into read pointer file 42 at the end of a memory block read and into write pointer file 41 at the end of a memory block write.

Initially, the read and write pointers for a given block will be equal indicating an empty block. This condition is detected by comparator 46. After the first data item is written into the particular block, the pointers are no longer equal and so that block is no longer empty. A block which has been written into 2,047 times more often than it has been read is considered full. In this state, the value of the write pointer is one less than the read pointer, modulo 2,048. This condition is detected by comparator 45. If an attempt is made to write into a full block, the updated write pointer would be equal to the read pointer. The comparator 45 detects this equality and its output is then used by TSI control logic 33 to inhibit the write operation.

Data from the switching processor 24 of FIG. 6 may be written into a pointer through a separate input to multiplexer 43. In this case, the second input to adder 44 is "0" rather than "1" so that the data is passed unchanged to the desired pointer file.

The output of multiplexer 43 may be read by the switching processor so that it can access the current value of any pointer. The switching processor may access data directly in memory 40 by way of the switching processor's address/data bus or from the hard FIFO 37 of FIG. 8.

Figure 10:
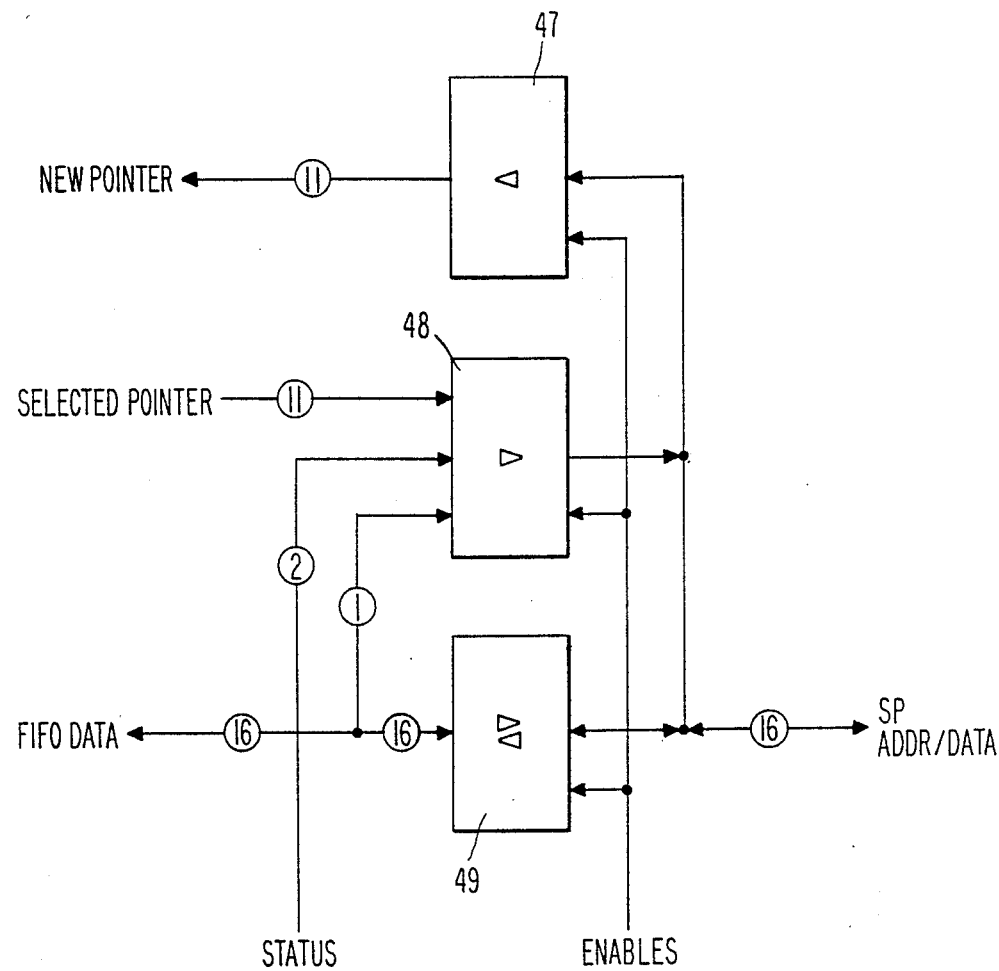
FIG. 10 is a diagram of the switching processor interface between the bus interface system and the switching processor.

Switching processor interface 32 of FIG. 7 is shown in more detail in FIG. 10 and merely comprises three buffers to serve as a data interface between the switching processor and the FIFO subsystem of FIG. 9. Buffer 47 is used to write new pointers to the FIFO subsystem while buffer 48 is used to read pointers from that subsystem. Buffer 49 is used to write data into the random access memory 40 of the FIFO memory.

TSI control subsystem 33 of FIG. 7 is illustrated in more detail in FIG. 11A. As shown therein, the heart of the control system is sequencing RAM 50 which, as was described above, serves as a control store for the TSI subsystem as illustrated in FIG. 7. RAM 50 is mechanized by a 1,024 word by 8 bit dual-ported memory. One port is used only for reading control words for the TSI subsection, while the other port is used by the switching processor 24 FIG. 6 to read the current content and also write new control words into RAM 50.

The contents of RAM 50 determine, on a clock by clock basis the operation that is to be performed. RAM 50 is driven by program counter 54 which sequences RAM 50 through consecutive addresses, thus producing the sequence of control words it is programmed to perform during each TSI bus cycle as was described above. At the end of that cycle, when an end of cycle signal is detected, counter 54 is reset so as to repeat the then programmed sequence. The output of RAM 50 is supplied to TSI control register 51 which drives TSI control generator 52 that transmits the appropriate control signals to the functional units of the TSI subsystem.

The respective elements are driven by TSI bus clock 53. In order to maintain all of the processing sites in sequence, the clock source and the processing sites are so arranged that the clock source is equidistant from each of the processing sites on a given TSI bus.

The respective control words that may be stored in RAM 50 in appropriate sequences are illustrated in FIG. 11B. Each control word is basically divided into two sections, one for controlling access to the TSI bus and the other for controlling data operations within the FIFO subsystem. As indicated in FIG. 11B, the two most significant bits independently specify whether or not the TSI interface should drive data onto the TSI bus and whether or not the data on the TSI bus should be captured by hard FIFO 37 of FIG. 8. If neither bit is set then the processing site will not participate in a TSI bus transaction during that time slot. If both bits are set then the TSI subsystem will both drive data on the bus and capture the data into hard FIFO 37.

The next two bits of the control word form an operation code which determines the type of operation to be performed by FIFO subsystem 31 of FIG. 7. As illustrated in FIG. 11B, one operation code allows the switching processor access to the respective FIFO blocks. Another operation code is one that must precede a read FIFO or a write FIFO so that any previously initiated switching processor FIFO operation can be completed. This particular code is also used to generate a TSI bus cycle termination code when bit 3 of the control word is a "one." The last two control words respectively cause FIFO data to be written into the TSI write register 35 and to transfer captured TSI data from hard FIFO 37 to the FIFO subsystem.

Because the fundamental FIFO read and write operations take more than one clock cycle, two consecutive sequencing RAM words must contain identical commands in order to accomplish the specified command.

EPILOGUE

A loosely coupled parallel network simulator has been described which employs a time multiplex bus to which a plurality of processing sites are coupled with each processing site being assigned one or more particular time slots during the bus cycle. Each processing site contains a sequencing RAM or control store which determines what clock time during the bus cycle that the processing site is to be given access for either transmission or reception of data segments. The different sequences, in which the sequencing RAM's for the various processing sites are programmed, control the simulation of the connections between the various processing sites which connections can be changed by reprogramming the respective sequencing RAM's. In this manner, various combinations of parallel networks can be simulated.

While but one embodiment of the present invention has been disclosed, it will be apparent to those skilled in the art that variations and modifications may be made therein without departing from the spirit and scope of the invention as claimed.

What is claimed is:

1. A network simulator for simulating a plurality of parallel processing networks, said simulator comprising:
   a plurality of buses for transmitting information segments to processing sites;
   each of said buses includes data line means to transmit an information segment, at least one control line means to transmit control information related to said information segment; and
   a reply line means for indicating that another processing site is coupled to said bus to receive said information segment; and
   a plurality of sets of processing sites each set being coupled to a given one of said plurality of buses, each processing site having a processor means and interface means coupling said processor to said bus; and
   clock means coupled to each of said interface means to synchronize time intervals during which said respective interface means couples it corresponding processor means to its corresponding bus; and
   time multiplex switching means coupled to each of said buses to receive an information segment from one of said buses for transmission on another of said buses; and
   each of said interface means including sequencing means coupled to said clock means to select during which time interval the corresponding processor means is to be coupled to its respective bus.

2. A simulator according to claim 1 wherein:
each sequencing means is a programmable control store.

3. A simulator according to claim 1 further including:
a plurality of counter means each coupled to said clock means and to a corresponding sequencing means to reset its corresponding sequencing means after a given number of time intervals.

4. A simulator according to claim 1 wherein:
each interface means includes transmitting means to transmit an information segment on its corresponding bus.

5. A simulator according to claim 1 wherein:
each interface means includes receiving means to receive an information segment from its corresponding bus.

6. A network simulator for the simulation of a plurality of different parallel processing networks, said simulator comprising:
bus means for the transmission of information segments to processing sites;
a plurality of processing sites each having a processor means and an interface means coupling said processor means to said bus means;
said bus means including data line means to transmit an information segment, at least one control line means for transmitting control information related to said information segment; and
a reply line means for indicating that another processing site is coupled to said bus means to receive said information segment; and
clock means coupled to each of said interface means to synchronize time intervals during which said interface means couples its respective processing site to said bus means; and
said interface means including sequencing means coupled to said clock means to select during which time interval the corresponding processing site is to be coupled to said bus means.

7. A simulator according to claim 6 wherein said interface means includes time multiplex switching means coupled to said bus means to receive an information segment from one bus of said bus means for transmission on another bus of said bus means.

* * * * *